March 1, 1932.  G. L. R. J. MESSIER  1,847,491
LANDING CARRIAGE FOR HIGH SPEED AIRPLANES
Filed Dec. 18, 1930   4 Sheets-Sheet 1
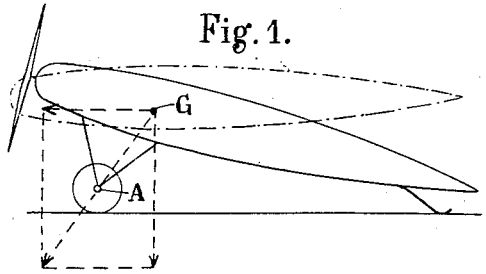
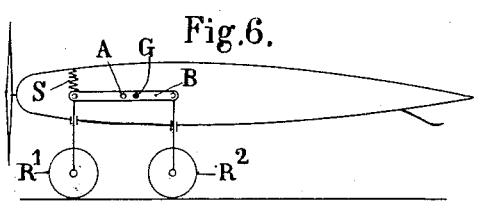
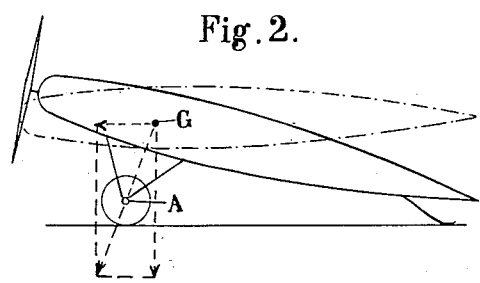
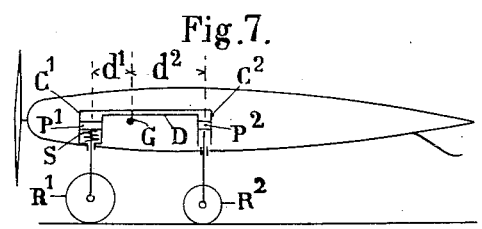
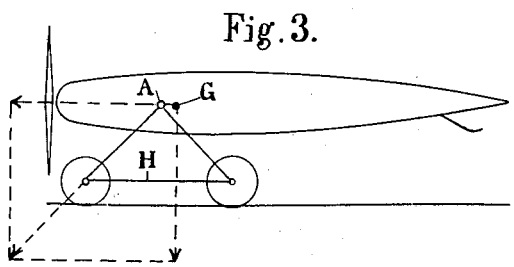
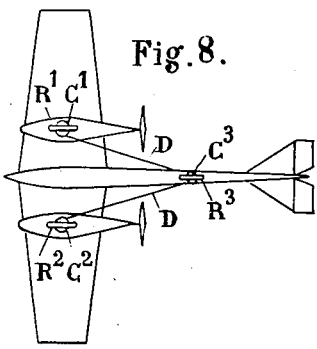
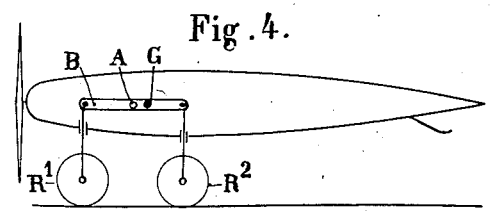
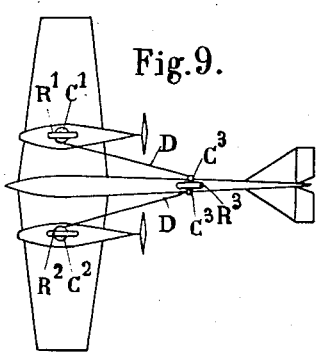
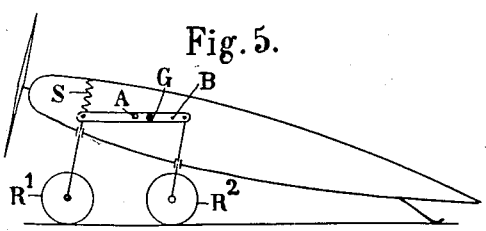

March 1, 1932. G. L. R. J. MESSIER 1,847,491
LANDING CARRIAGE FOR HIGH SPEED AIRPLANES
Filed Dec. 18, 1930  4 Sheets-Sheet 2

G. L. R. J. Messier
INVENTOR

By: Marks & Clerk
Attys.

March 1, 1932.  G. L. R. J. MESSIER  1,847,491
LANDING CARRIAGE FOR HIGH SPEED AIRPLANES
Filed Dec. 18, 1930  4 Sheets-Sheet 3
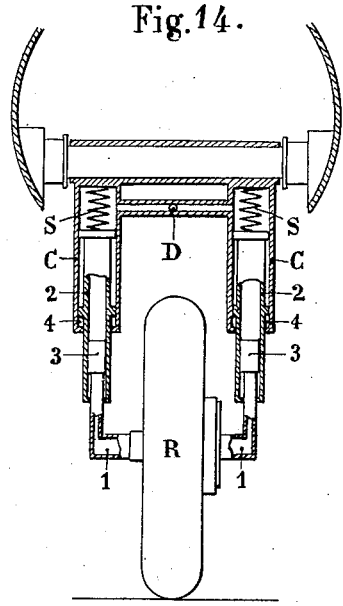
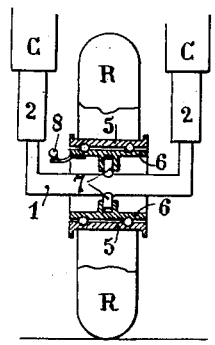
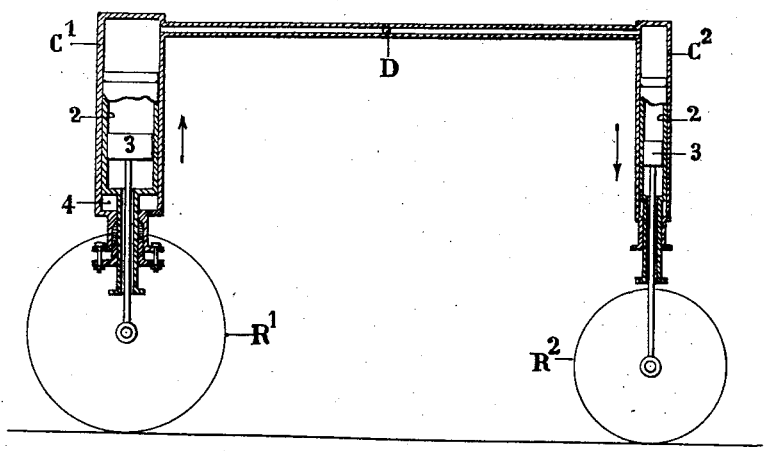

March 1, 1932.  G. L. R. J. MESSIER  1,847,491
LANDING CARRIAGE FOR HIGH SPEED AIRPLANES
Filed Dec. 18, 1930  4 Sheets-Sheet 4

Patented Mar. 1, 1932

1,847,491

UNITED STATES PATENT OFFICE

GEORGE LOUIS RENÉ JEAN MESSIER, OF MONTROUGE, FRANCE

LANDING CARRIAGE FOR HIGH SPEED AIRPLANES

Application filed December 18, 1930, Serial No. 503,275, and in France December 23, 1929.

Realization of very high speed airplanes adapted to fly over land is, for the greater part, subordinated to the creation of landing carriages giving to the airplane a very great stability on the ground, upon landing or upon flying off. Actual conceptions of landing carriages in which the airplane is supported by two wheels side by side are far from satisfying this condition, as their instability, even at relatively small speeds, is a well known fact.

Stable forms are those in which two wheels are arranged tandem-wise, or those comprising two pairs of wheels side by side, the first solution (recalling that of the motor cycle) being moreover much superior to the other (similar to that of the motor car), since it corresponds to a much more reduced maximum cross-section.

In the same order of ideas, a serious difficulty is encountered in that the airplane pivots about the axle for passing from the position in which it runs on the ground to the position in line of flight.

The invention is clearly illustrated in the accompanying drawings, in which:—

Figure 10:
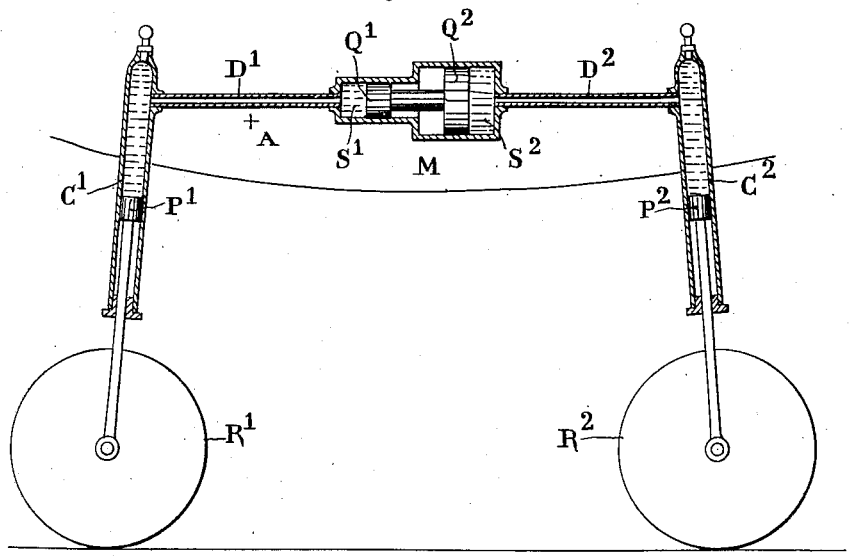
Figure 11:
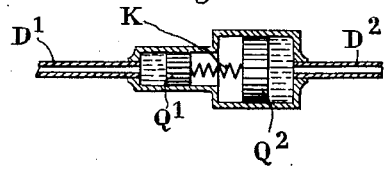
Figure 12:
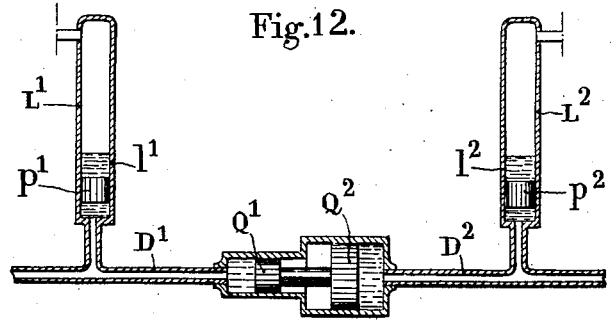
Figure 13:
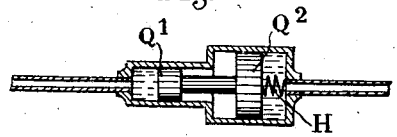
Figure 17:
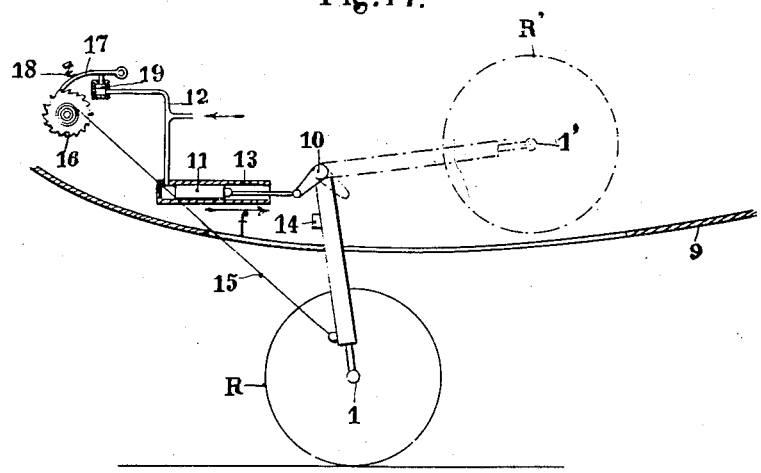
Figure 18:
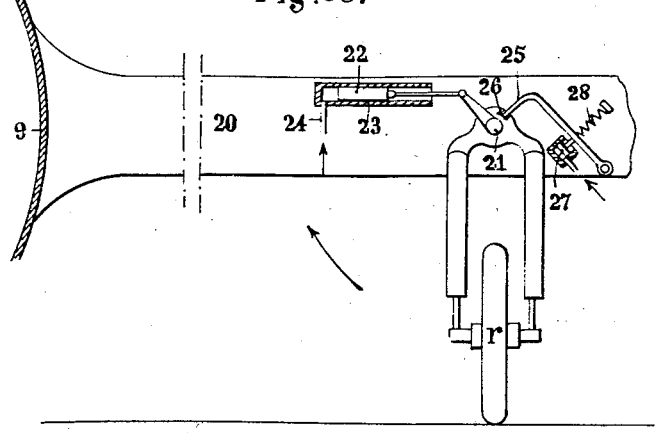

Figs. 1 to 3 inclusive are diagrammatic side elevational views of airplanes with landing carriages, Figs. 4 to 6 inclusive represent the diagrammatic side elevational views of airplanes with landing carriages having details constructed in accordance with the present invention, Fig. 7 is a diagrammatic side elevational view of a slightly modified form of the invention embodying the use of a hydraulic rocking beam, Figs. 8 and 9 are diagrammatic top plan details of further modifications, Fig. 10 is an enlarged vertical longitudinal sectional detail of a hydraulic rocking beam, Fig. 11 is a fragmentary longitudinal section of a modification of the arrangement shown in Fig. 10, Fig. 12 is an enlarged vertical and longitudinal sectional detail of further forms of the invention, Fig. 13 is a fragmentary longitudinal sectional view of the modification of the arrangement shown in Fig. 12, Figs. 14 and 15 are respectively vertical cross sectional and longitudinal sectional views of a modification of the invention for ensuring balancing and suspension, Fig. 16 is a modification of the arrangement shown in Fig. 14, and Figs. 17 and 18 are diagrammatic views of a system constructed in accordance with the invention for raising the landing carriage during flight.

In fact, see Fig. 1 of the accompanying drawings, if the axle A (pivoting axis) is located well forward relatively to the centre of gravity G, the braking of the wheels does not risk compromising the stability, but, on the other hand, the rear of the airplane lifts with greater difficulty for taking the "line of flight" position.

On the contrary, if the axle is located farther back, in the neighbourhood of the perpendicular to the centre of gravity (Fig. 2), the rear of the airplane easily lifts, but a relatively sudden braking may cause the airplane to turn over.

A theoretical solution consists (Fig. 3) in raising the pivoting axis A to the vicinity of the centre of gravity G, the landing carriage being then constituted by two wheels arranged tandem-wise, (or by two pairs of wheels arranged tandem-wise) coupled by a frame H, on which the airplane oscillates about the axis A.

But this solution is not practical owing to difficulties of construction and to objections relating to the weight and cumbersomeness.

The preceding remarks being taken into consideration, a feature of the present invention consists (Figs. 4 to 6) in hanging a landing carriage, composed of two wheels $R^1$, $R^2$ (or of two pairs of wheels) arranged tandem-wise, from the ends of a rocking beam B, oscillating about an axis A adjacent to the centre of gravity G.

In these conditions, the airplane can easily take its "line of flight" position and, on the other hand, the stability on the ground is ensured in the middle vertical plane of the machine. The lateral stability, for low speeds on the ground may be ensured by the use of auxiliary rollers arranged under the planes, or by means of a gyroscopic system.

During flight, the position of the rocking beam, that is to say of the wheels, must be fixed. For that purpose, use will be made of any suitable returning system, diagrammatically illustrated in Figs. 5 and 6 by the spring S. In practice, the constitution of the rocking beam B may be varied. The function of this rocking beam is, in fact, to establish a relation between the distances respectively separating the wheels and a fixed line integral with the fuselage of the apparatus. Another object of the invention precisely resides in a particularly characteristic and convenient form of construction of this rocking beam (Fig. 7).

A hydraulic or pneumatic rocking beam is substituted for the rigid member B.

In this device, the axis of each wheel $R^1$ (or $R^2$) is rigid with a piston $P^1$ (or $P^2$), moving in a cylinder $C^1$ (or $C^2$). Both cylinders are rigid with the fuselage and communicate together by means of a pipe line D filled with a suitable liquid or with a gas under pressure; their rectilinear sections are approximately reversely proportional to the distances $d^1$ and $d^2$ separating their axes from the centre of gravity G.

A returning system S is here again provided, in order that, in line of flight, the wheels may be held in a definite position.

The device of Fig. 7 is applicable to the case of four carrying wheels arranged per pairs side by side.

It is also applicable (Fig. 8) to the case of three main wheels (two side wheels $R^1$, $R^2$ under the planes and an axial wheel $R^3$ at the rear). The cylinder $C^3$ of the rear wheel is then in communication with each of the cylinders $C^1$, $C^2$ of the front wheels, or, better, this cylinder is divided into two parallel cylinders (Fig. 9) each communicating with one of the front cylinders for avoiding intercommunication of the latter.

In practice, the necessity of providing cylinders having sections reversely proportional to the lengths of the leverages of the theoretical rocking beam may present inconveniences. In fact, the diameters of the cylinder of smallest section, having a lower limit due to the necessities of construction and of rigidity, it may be necessary to give to the cylinder of largest section prohibitive diameters.

Finally, on one and the same airplane, the point of theoretical oscillation of the rocking beam cannot be displaced, for instance for trials, without compulsorily changing one of the two cylinders.

Fig. 10 diagrammatically illustrates a device derived from the preceding ones and by means of which it is possible to suspend the landing carriages from cylinders having any section or equal sections, whilst preserving all the advantageous features of this rocking beam system.

A pressure and load amplifying device M is mounted on the pipe line $D^1$—$D^2$ (filled with a suitable liquid or with a gas under pressure), which connects the cylinders $C^1$ and $C^2$, having any section but which will be assumed to have here equal sections. This amplifying device is constituted by a piston having two heads $Q^1$—$Q^2$ movable in a cylinder having two chambers $S^1$—$S^2$, the sections of which are unequal.

Consequently, if, for instance, the rectilinear section of $S^1$ is four times smaller than that of $S^2$, the pressure existing in $D^1$—$C^1$, when the airplane finds its balance on its rocking beam about a theoretical axis of oscillation A adjacent to its centre of gravity, is four times greater than that existing in $D^2$—$C^2$, so that the piston $P^1$ supports a load four times greater than that of piston $P^2$.

For modifying the conditions of this balance, it suffices to replace the amplifying device M by another, presenting a characteristic $$\frac{Q^1}{Q^2}$$

which is different.

This operation can be effected rapidly without having to interfere with the supporting cylinders. The provision of this amplifying device, combined with supporting cylinders having any section, renders the use of this type of landing carriage much more flexible or supple.

A landing carriage answering to this conception of hydraulic rocking beam about which the airplane balances, either when starting on the ground, or at the moment it takes its line of flight, leads to particular, simple and secure solutions of the problem of suspension of the airplane when running on the ground and of withdrawing the wheels within the fuselage during flight, in order to diminish head resistance and, consequently, to obtain very high speed airplanes.

In particular, this amplifying device allows to obtain a simple solution of the problem of the resilient suspension of the airplane when running on the ground.

In fact, referring to Fig. 11 of the accompanying drawings, it will be seen that it suffices to replace the piston-block of the preceding figure by two elementary pistons $Q^1$—$Q^2$ connected by a resilient member, such as a spring K, or a pneumatic or oleo-pneumatic device.

This resilient suspension can also be obtained as shown in Fig. 12, by means of air bells $L^1$, $L^2$ connected to the pipe lines $D^1$—$D^2$.

In these bells, filled with a gas under pressure, can move pistons $p^1$—$p^2$, a liquid layer $l^1$—$l^2$ can eventually separate the pistons and the gas under pressure.

As previously stated, it is necessary that during flight, the position of the rocking beam, that is to say of the wheels, should be fixed. The returning device can be very simply constituted by a spring H or any resilient system, interposed between one of the pistons, for instance $Q^2$, and the bottom of the corresponding cylinder (Fig. 13). In these conditions, during flight, the wheel $R^1$ remains at the bottom of its supporting cylinder. Of course, the action of the spring is taken into consideration for the determination of the conditions of equilibrium of the double piston.

A similar device also allows, during flight, to hold the wheels stationary in any position of their movement, instead of one of the two extreme positions, which may be advantageous concerning head resistance or eventual withdrawing of the wheels within the fuselage.

Figs. 14 and 15 diagrammatically illustrate a modification of the device adapted to ensure balancing and suspension. Each wheel R rotates on an axle 1 supported by two suspension members of any type, the latter can, for instance, be constituted by pneumatic or oleo-pneumatic suspension members.

In the example shown in the drawings, each of these suspension members, called landing members, essentially comprise a cylinder 2 in which moves a simple or double piston 3, with, eventually, a diaphragm perforated with narrow orifices, this structure being known per se. This cylinder 2 itself forms a piston in a balancing cylinder C having the same function as that of the cylinders $C^1$—$C^2$ of Fig. 7. For securing the wheels in position during flight, either springs S are provided, or, a permanent pressure is provided under one of the cylinders 2, in the space 4.

As previously, the cylinders C of both wheels communicate together through a pipe line D filled with liquid or with a gas under pressure. One of the wheels (Fig. 16) can be so mounted as to ensure steering when the airplane runs on the ground. For that purpose, the hub 5 of the wheel rotates on a false hub 6 capable of pivoting on a axis 7 and is held or angularly moved by a lever 8 actuated in a suitable manner by the pilot.

Both wheels, or only one of them, are provided with brakes.

By employing pneumatic tyres of large section, presenting in themselves a sufficient suppleness, it could be possible whilst maintaining the balancing system constituting an essential object of the invention, to omit the suspension members of the preceding figures.

The system according to the invention for raising the landing carriage during flight, is diagrammatically illustrated in Figs. 17 and 18.

An indispensable condition to be fulfilled by such a system is to ensure in any eventuality, the instantaneous descent and locking of the landing carriage, in order that the airplane may alight or land whatever may be the incidents of the flight. In particular, any damage happening to the raising or lifting system should not have the possible consequence of locking the landing carriage in its raised position. According to the invention, use is made of a raising or lifting system with hydraulic control, constructed in such a manner that the lack of pressure in the pipe lines or cylinders, instantaneously causes the descent and locking of the wheels in their lowered position. In these conditions, if leakage for instance occurs at any point of the system, the landing carriage automatically falls or lowers to its landing position.

Two main pivoting directions can of course be provided for raising the wheels. In the example under consideration, the main wheels (Fig. 17) rise by turning in the plane of symmetry of the airplane. The small side wheels or rollers arranged under the planes, rise in perpendicular directions (Fig. 18).

Assuming the main wheels are mounted tandem-wise in the plane of symmetry of the fuselage 9 (Fig. 17), each of these wheels can be raised by rotation about an axis 10, so, as to pass from the position R to the position $R^1$, the axle 1 coming to the position $1'$. This rotation is controlled by a piston 11, which is pushed in the direction of the arrow $f$ when a fluid under pressure is sent in the pipe line 12 leading to the cylinder 13. An abutment 14 determines the lower position of the wheel. Near the axle is attached a cable 15 which winds up on the spindle of a ratchet wheel with which cooperates a pawl 17 provided with a spring 18. Upon raising of the wheels, the fluid under pressure, acting on a small auxiliary piston 19 (at the same time as on the main piston 11), lifts the pawl and releases the ratchet wheel 16, thus allowing the cable to unwind. For returning the wheels to their landing position, it suffices to cause the pressure to fall in the pipe line 12. The cable 13 then winds up on the ratchet wheel 16 (under the action of a suitable returning member), and this wheel is finally held stationary by the pawl 17; the cable holds the landing carriage in its landing position.

In the example of Fig. 18, the small side wheels or rollers $r$ are withdrawn, during flight, within the planes 20 of the airplane, by turning on spindles 21 parallel to the plane of symmetry of the latter. This rotation is controlled, as previously, by the displacement of a piston 22 movable in a cylinder 23 supplied with fluid under pressure by a pipe line 24. The locking of the small wheels or rollers in their landing position is effected, for instance, by means of a bolt 25 entering a staple 26. For effecting the raising or lifting operations, the fluid under pressure sent under an auxiliary piston 27, lifts the bolt 25 in opposition to the action of the spring 28 and allows the pivotal movement of the small wheel or roller.

In the application of the invention to airplanes of large dimensions having a high maximum cross-section, or to airplanes having a double fuselage, the "motor cycle" solution would be insufficient, as it is necessary that the airplane rests on more than two wheels for dividing the load upon contact with the ground. Two pairs of wheels, arranged tandem-wise, will then be used on each fuselage.

In this case, a hydraulic rocking beam must be provided for each fuselage. These rocking beams will be independent. On the ground, the airplane always runs on its four wheels, whatever may be the unevenness of the ground.

Of course, each rocking beam will preferably be provided with the amplifying and other devices shown in the accompanying drawings.

The correct steering, when running on the ground, can be ensured owing to a mounting of the two front wheels, according to Jeantaud's diagram. The diagram or quadrilateral of Jeantaud is the well known construction adopted for the control of the front axle of automobile vehicles. It is pointed out that in order to make a curve without the skidding of the wheels on the ground, the axes of the four wheels must constantly meet in a common point. Since the rear axle is fixed the axles of the front wheels must meet on the rear axle or on the extension thereof. This condition is approximately realized by means of Jeantaud's diagram or quadrilateral.

The four wheels can also be made to act as steering wheels; the front wheels, for steering when running on the ground when flying off or upon alighting, will act as steering wheels with a very small angle of deviation, since, at this moment, the evolutions of the airplane approximate a straight line or curves of large radius; the rear wheels will be made to act as steering wheels with possibility of a large angle of deviation allowing the airplane to effect a quarter of a revolution, on the spot, when it has to enter a shed.

Claims:—

1. Landing carriage for airplanes, comprising two wheels arranged tandem-wise in the axis of the airplane, two pistons respectively rigid with the axle of each of these wheels, two cylinders integral with the fuselage of the airplane and in which these two pistons respectively move, communication pipings integral with the fuselage and connecting both cylinders and a fluid under pressure contained in the said cylinders and pipings.

2. Landing carriage for airplanes, comprising a series of wheels arranged tandem-wise per pairs, a series of pistons respectively rigid with the axle of each of these wheels, cylinders integral with the fuselage of the airplane and enclosing these pistons, communication pipings integral with the fuselage and connecting the two cylinders of one and the same pair of wheels and a fluid under pressure in the said cylinders and pipings.

3. Landing carriage for airplanes comprising two side wheels and an axial wheel, three pistons respectively rigid with the axle of each of these wheels, three cylinders for these pistons, communication pipings between the said cylinders and a fluid under pressure in the said cylinders and pipings.

4. Landing carriage for airplanes, comprising two side wheels and an axial wheel, two pistons respectively rigid with the axle of the two side wheels, two pistons rigid with the axle of the axial wheel, two side cylinders and two axial cylinders respectively for each piston, communication pipings between each of the side cylinders and the corresponding axial cylinder and a fluid under pressure filling these various cylinders and pipings.

5. Landing carriage for airplanes, comprising two wheels arranged tandem-wise, two pistons respectively rigid with each the axle of these wheels, two cylinders integral with the fuselage of the airplane and in which these two pistons respectively move, means for causing the hydraulic rocking beam thus constituted to oscillate about a point adjacent to the centre of gravity of the airplane.

6. Landing carriage for airplanes, comprising two wheels arranged tandem-wise, two pistons respectively rigid with the axle of each of these wheels, two said carrying cylinders integral with the fuselage of the airplane and in which these two pistons respectively move, a communication piping between the two carrying cylinders, a two-chamber balancing cylinder interposed in this piping, a double piston in the said balancing cylinder and a fluid under pressure contained in the piping respectively between each of the carrying cylinders and each of the chambers of the balancing cylinder.

7. Landing carriage for airplanes, comprising two wheels arranged tandem-wise, two pistons respectively rigid with each of these wheels, two cylinders integral with the fuselage of the airplane and in which these two pistons respectively move, communication pipings integral with the fuselage and connecting said both cylinders, a fluid under pressure contained in the said cylinders and pipings, means for fixing the position of the wheels during flight.

8. Landing carriage for airplanes, comprising two wheels arranged tandem-wise, two pistons respectively rigid with each of these wheels, two carrying cylinders integral with the fuselage of the airplane and in which these two pistons respectively move, a communication pipings between the two said carrying cylinders a two-chamber balancing cylinder interposed in this piping, a double piston in the said balancing cylinder, and a fluid under pressure contained in the pipings respectively between each of the carrying cylinders and each of the chambers of the balancing cylinder.

9. Landing carriage for airplanes, comprising two wheels arranged tandem-wise, two pistons respectively rigid with each of these wheels, two carrying cylinders integral with the fuselage of the airplane and in which these two pistons respectively move, communication piping between the two said carrying cylinders, a two-chamber balancing cylinder interposed in this piping, a double piston in the said balancing cylinder, a fluid under pressure contained in the piping respectively between each of the carrying cylinders and each of the chambers of the balancing cylinder and a resilient returning device for fixing the position of the wheels during flight.

10. Landing carriage for airplanes, comprising two wheels arranged tandem-wise, two pistons respectively rigid with each of these wheels, two carrying cylinders integral with the fuselage of the airplane and in which these two pistons respectively move, communication piping between the two said carrying cylinders, a two-chamber balancing cylinder interposed in this piping, a double piston in the said balancing cylinder, a fluid under pressure contained in the piping respectively between each of the carrying cylinders and each of the chambers of the balancing cylinder, a resilient member connecting the two elements of the said double piston.

11. Landing carriage for airplanes, comprising two wheels arranged tandem-wise, two pistons respectively rigid with each of these wheels, two carrying cylinders integral with the fuselage of the airplane and in which these two pistons respectively move, a communication piping between the two carrying cylinders, a two-chamber balancing cylinder interposed in this piping, a double piston in the said balancing cylinder, a fluid under pressure contained in the piping respectively between each of the carrying cylinder and each of the chambers of the balancing cylinder and air bells connected to the said pipings.

12. Landing carriage for airplanes, comprising two wheels arranged tandem-wise, two pistons respectively rigid with each of these wheels, two cylinders integral with the fuselage of the airplane and in which these two pistons respectively move, communication piping between both cylinders, a fluid under pressure contained in the said cylinders and pipings, an axle for each wheel, two resilient suspension members for the said axles.

13. Landing carriage for airplanes, comprising two wheels arranged tandem-wise, a lifting shaft carrying each of the wheels, a piston controlling the angular displacement of the said shaft, a lifting cylinder in which can move the said piston, means for sending a fluid under pressure in the said cylinder, means for fixing the running position of the wheel, means controlled by the fluid under pressure for unlocking the said fixing means.

14. Landing carriage for airplanes, comprising two wheels arranged tandem-wise, a lifting shaft carrying each of the wheels, a piston controlling the angular displacement of the said shaft, a lifting cylinder in which can move the said piston, a cable fixing the running position of the wheel, a ratchet on which the said cable can wind, a pawl capable of holding this ratchet stationary, an unlocking piston rigid with the said pawl, a cylinder for the said unlocking piston, means for sending fluid under pressure in the said cylinder at the same time as in the lifting cylinder, a returning member for the ratchet wheel.

15. Landing carriage for airplanes, comprising two wheels arranged tandem-wise, two pistons respectively rigid with each of these wheels, two cylinders integral with the fuselage of the airplane and in which these two pistons respectively move, communication pipings between both cylinders, a fluid under pressure contained in the said cylinders and pipings, a false hub for one of the wheels, a spindle on which this false hub can pivot, a lever for angularly moving the said spindle.

The foregoing specification of my: "Landing carriage for high speed airplanes" signed by me this 3rd day of December, 1930.

GEORGE LOUIS RENÉ JEAN MESSIER.